Nov. 2, 1926.
D. A. MIDGLEY ET AL
1,605,262
FAUCET VALVE
Filed Feb. 24, 1926
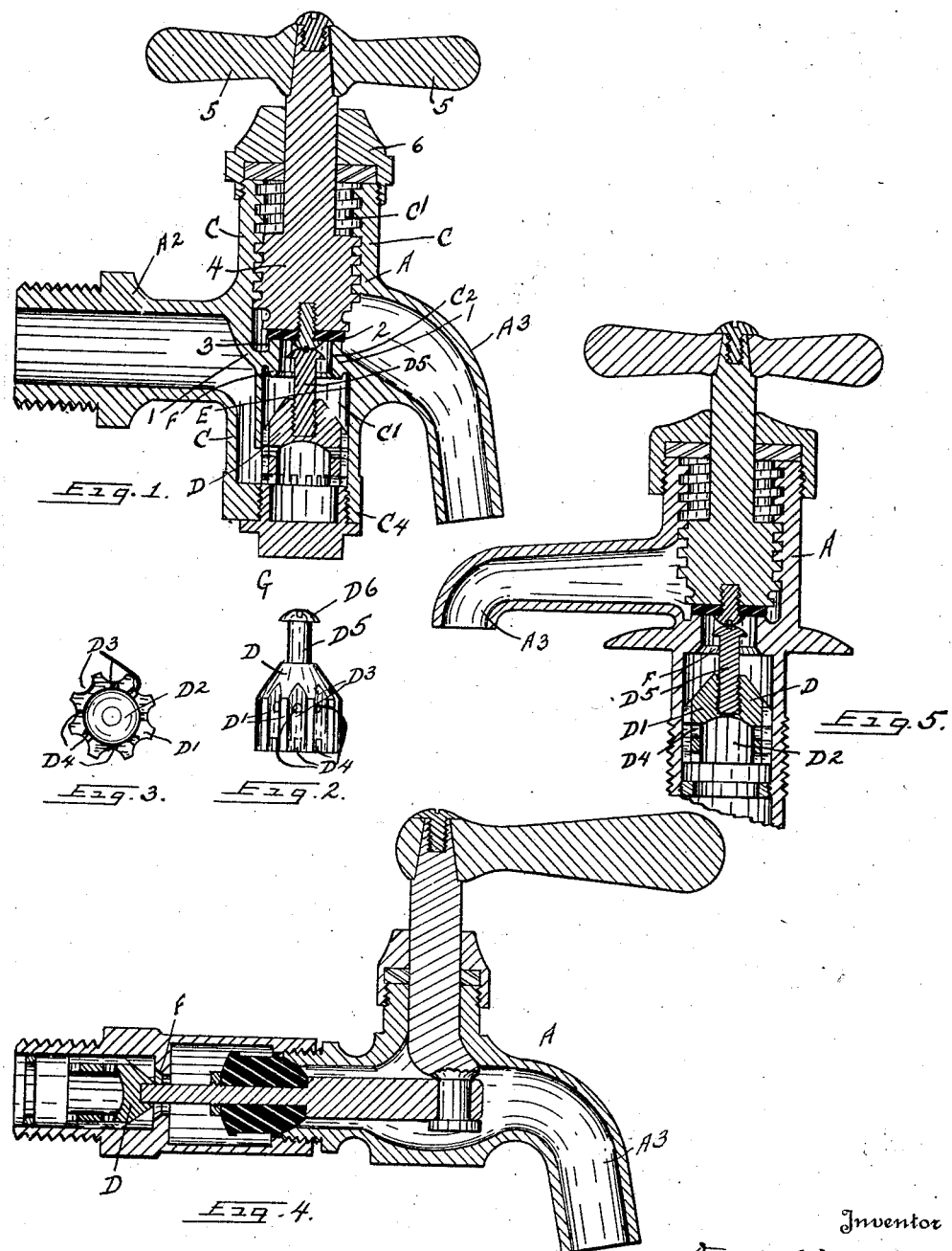

Patented Nov. 2, 1926.

1,605,262

UNITED STATES PATENT OFFICE.

DAVID A. MIDGLEY AND AUGUST V. NIELSEN, OF SALT LAKE CITY, UTAH, ASSIGNORS OF SEVENTEEN TWENTY-FOURTHS TO SAID NIELSEN AND SEVEN TWENTY-FOURTHS TO WILLIAM A. JONES, OF SALT LAKE CITY, UTAH.

FAUCET VALVE.

Application filed February 24, 1926. Serial No. 90,270.

Our invention relates to valves, and has for its object to provide a faucet having the conventional valve, and means to operate it in combination with an auxiliary valve carried and operated within the casing of the conventional faucet, whereby the liquid flow through the conventional portion of the faucet may be temporarily stopped by the auxiliary valve while repairs are made on the conventional valve. Our improvement can be equally well applied to valves for fluids, such as air valves, gas valves, steam valves and all fluids.

These objects we accomplish with the device illustrated in the accompanying drawings in which similar letters and numerals of reference indicate like parts throughout the several views and as described in the specification forming a part of this application and pointed out in the appended claims.

In the drawings in which we have shown the best and most substantial embodiment of our invention, Figure 1 is a vertical longitudinal section of a faucet constructed to carry out the principles of our invention. Figure 2 is an elevation of the auxiliary valve. Figure 3 is an inverted plan view of the auxiliary valve. Figure 4 is a section showing a modification of our invention to use it in connection with sink faucets. Figure 5 is another modification of our invention as used in connection with a basin or Fuller faucet.

The device consists of a casing A having an inlet threaded end $A^2$ to engage the pipe through which liquid or fluid is carried under pressure. The casing A has an outlet end $A^3$ with a partition 1 between said ends. The said casing A has a transverse casing C integral therewith which is centrally bored, as at $C^1$. A constricted portion formed by said partition has a smaller bore $C^2$ which passes through the said partition 1. A portion of said casing C is given the conventional shape and elements, such as the valve 2, seats 3, stem 4, hand crank 5 and cap 6. The partition 1 has a sleeve flange E integrally formed on the opposite face from the said seat member 3 to form a cylindrical casing for the auxiliary valve D which is operated longitudinally within casing E. The wall of said casing E is spaced on one portion from the interior wall of said casing C to allow fluid to flow from the said inlet end $A^2$, to pass under and through said sleeve flange and then through the bore $C^2$ of the partition 1. The adjacent or auxiliary side of said partition is cut to form a seat F for the auxiliary valve D. An end portion $C^4$ of said casing C is internally threaded to receive a screw plug G by which the auxiliary valve D is retained within its casing E. The auxiliary valve D consists of a valve plug $D^1$, which is cylindrical in general form with a central recess $D^2$ bored in one end and with its other end given a conical shape to fit within its seat F when contiguous. The perimeter of said auxiliary valve D has a plurality of longitudinal grooves $D^3$ cut therein. Radial holes and slots $D^4$ are provided through the plug which connect the said central bore $D^2$ with the bottom of each of said grooves $D^3$ to allow fluid to pass therethrough to the central bore, with force enough to move said auxiliary valve to its seat F. The ribs $D^1$ between the grooves $D^3$ are of a general conformity with the perimeter of a circle and hold the valve D loosely within the cylinder casing $C^1$. A stem $D^5$ is secured in the auxiliary valve which spaces the main valve 4 from the auxiliary valve, and said stem has a flanged head $D^6$; when the main valve is used the auxiliary valve is unseated and the flow of liquid is through the grooves $D^3$ and between the conical end of the valve plug and its seat, and through the narrowed bore $C^2$ and exit $A^3$. Some of the flowing liquid strikes against the under side of said head 6, which aids in the initial movement of the auxiliary valve to seat. With slight modifications to fit the several types of faucets, the same invention will be applicable in any of the conventional types of faucets as those shown in Figures 4 and 5.

When it is desired to repair the main valve 2 its stem 4 is rotated in the usual manner and the valve is moved within the bore $C^1$ with the auxiliary kept in the same spaced relation to the main valve by the flow of the liquid until the auxiliary valve is seated against its seat F, which stops all flow. The main valve is then removed and repaired, and when replaced within its bore $C^1$ and turned to its seat 3 the auxiliary valve is moved out of the flow of liquid.

Having thus described our invention we desire to secure by Letters Patent and claim:—

1. A device of the class described comprising a valve plug having a frusto-conical end; longitudinal grooves cut in the periphery of said valve plug; radial openings from the bottom of said grooves to the interior of said valve plug; and an adjustable tap screw secured in the frusto-conical end of said plug.

2. A device of the class described, comprising a casing; a main valve stem operable within said casing; an auxiliary valve plug also operable within said casing; a stem connected with said valve plug adapted to contact with said main valve stem and move said auxiliary valve within said casing a plurality of longitudinal grooves in the periphery of said valve plug; radial openings connecting the bottom of said grooves with a central bore in said valve plug.

In testimony whereof we have affixed our signatures.

DAVID A. MIDGLEY.
AUGUST V. NIELSEN.